March 25, 1969 H. G. BENGTSSON 3,435,430
MULTISTAGE MAGNETIC SHIFT REGISTER WITH
EACH STAGE HAVING FOUR CORES
Filed Nov. 13, 1964
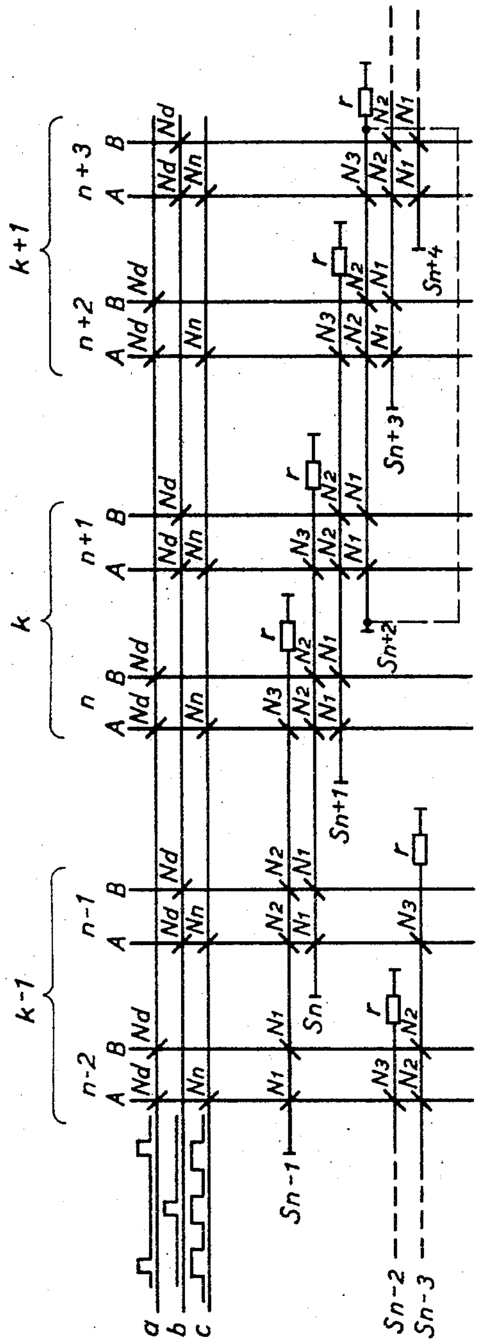
INVENTOR.
HANS GEORG BENGTSSON
BY [signature]
ATTORNEYS United States Patent Office 3,435,430

Patented Mar. 25, 1969

3,435,430

MULTISTAGE MAGNETIC SHIFT REGISTER WITH EACH STAGE HAVING FOUR CORES

Hans Georg Bengtsson, Hagersten, Sweden, assignor to Telefonaktiebolaget L M Ericsson, Stockholm, Sweden, a corporation of Sweden Filed Nov. 13, 1964, Ser. No. 410,958

Claims priority, application Sweden, Dec. 19, 1963, 14,196/63

Int. Cl. G11b *5/00*, H01f *35/00;* H03k

U.S. Cl. 340—174 1 Claim

ABSTRACT OF THE DISCLOSURE

A magnetic shift register comprises a plurality of stages, each stage having a first and a second substage and each substage having two magnetic cores with a plurality of windings. The windings are arranged such that when the two cores of the one substage are in a "1"-state and the two cores of the preceding substage and the two cores of the succeeding substage are in a "0"-state and a predetermined sequence of pulses is fed to certain ones of the core windings, the first core in the "1"-state will be switched to the "0"-state and then the second core initially in the "1"-state will be switched to the "0"-state, whereupon the two cores in the succeeding substage will be switched to the "1"-state.

The present invention refers to a shift register and more particularly to a magnetic shift register for storing and stepping forward binary information through a number of magnetic core register stages. Each register stage comprises a first and a second sub-stage which are fed with a first and a second shifting pulse, respectively, in all register stages so that each sub-stage in 1-condition is switched to 0-condition, causing the succeeding sub-stage to be switched to 1-condition.

Two types of magnetic shift registers are known, one type having one core and the other type two cores for each sub-stage or bit. In the first mentioned type, for example, a delay network or a capacitor and a rewriting connection are necessary between the cores. The necessary number of electric components for each bit will be one core, one capacitor and two diodes. Furthermore, there must be provided a common current pulse generator and a controlled rewriting connection. In the two-core type, static relays are used to provide the necessary isolation between the cores. This configuration requires two diodes per core and the switching of the cores occurs in two phases. Thus, there must be two cores and four diodes for each bit, and two current pulse generators with control circuits.

A disadvantage of these known types of magnetic shift registers is that each core is provided with a number of individual windings which are connected to each other by means of other components, preferably diodes. Accordingly, the costs of production of the winding will be great. Furthermore, a great number of soldering points are necessary between the winding wire and the components. Thus, the mounting of the shift register is more difficult and more expensive.

An object of the invention is to provide a magnetic shift register consisting of only winding wire and magnetic cores which in addition to providing storage also provide the necessary isolation between the stages, thus, reducing production costs.

Briefly the invention contemplates a magnetic shift register having a plurality of stages. Each of the stages comprises first and second substages each having first and second magnetic cores. The cores are settable to a 0-remanent state or a 1-remanent state. There are three pulse sources. The first pulse source generates switching pulses for 0-setting the cores in the first substage of each stage; the second pulse source generates switching pulses for 0-setting the cores in the second substage in each stage; and the third pulse source generates switching pulses for 0-setting the first core in each substage during the intervals of the pulses generated by the first and second pulse sources without influencing the second core of the substage.

The invention will be described in greater detail herebelow by making reference to the accompanying drawing which shows a magnetic shift register according to a preferred embodiment of the invention. The shift register has three successive stages, $k-1$, $k$, $k+1$. Each stage consists of two sub-stages indicated by reference numerals $n-2$, $n-1$, $n$ and so on. Each sub-stage comprises two cores A and B. Through the wire *a* switching pulses are fed to the winding N*d* of the first sub-stage of each stage while through the wire *b* switching pulses are fed to the windings N*d* of both cores of the second sub-stage. The switching pulses are the same a 180° phase shift relative to each other. During the intervals between the switching pulses a zero setting pulse is fed through the wire *c* to a winding N*n* of the first core of all sub-stages. Reference characters, S*n*, S*n*+1, S*n*+2, etc. designate the wire loops which connect the magnetizing windings N2, N2 of each sub-stage with each other and with the windings N1, N1 of the preceding sub-stage and furthermore with the winding N3 of the first core of the succeeding sub-stage. Thus, the number of the wire loops corresponds to the number of sub-stages.

In order to explain the function of the shift register it will be assumed that both cores of the sub-stage $n-1$ are in 1-condition. The zero-setting pulse through the wire *c* sets the core A to zero, as has been mentioned previously, after which only the core B will be in 1-condition. The next switching pulse through the *b*-wire will set to zero the core B of the sub-stage $n-1$. Consequently the cores A and B of the sub-stage *n* will be switched to 1-condition. The condition for the switching of the cores is that the number of turns in the winding N1 of the core B of sub-stage $n-1$ be greater than in the windings N2 of the cores in the stage *n* taken together. The core A of the sub-stage $n+1$ will not be operated upon the switching of the core B of the sub-stage $n-1$ as it is maintained set to zero by means of the winding N*d* which obtains a switching pulse at the same time as sub-stage $n-1$. The core A of sub-stage $n-1$ will not switch as it is already set to zero as has been mentioned previously. The isolation in the forward direction against switching of the cores of the sub-stage $n+1$ is obtained by winding the windings N1 of the cores of the sub-stage *n* in opposite directions so that the generated voltages neutralize each other and no current can flow. Thus these two windings must be equally large. In the direction towards the sub-stage $n-2$ the isolation against switching of the cores is obtained because the voltage which arises in the wire loop S*n*—1 of the winding N2 of the core B in the sub-stage $n-1$ when said core is set to zero, will be neutralized by the voltage generated in the winding N3 of the core A of the sub-stage *n*. Consequently these windings must be equal. The size of the zero setting pulse is chosen in such a way that, by a suitable dimensioning of the winding N*n*, it can operate the first core of each sub-stage but not the second core in any of the sub-stages.

The series resistance designated by *r* may be dispensed with when making use of the line resistance of the winding wire as it is indicated by a dotted line in the loop S*n*+2. Each transmission loop then consists of only one wire of definite length and thickness which has only one soldering point. This point consists, for example, of a common grounded point for all loops. In a practical example the number of the turns of windings was: $Nd=1$ turn, $Nn=10$ turns, $N1=3$ turns, $N2=1$ turn and $N3=1$ turn.

I claim:

1. A magnetic shift register having a number of stages, each stage comprising a first and a second sub-stage and each sub-stage comprising a first and a second magnetic core, a first pulse source generating periodic switching pulses for 0-setting the cores in the first sub-stage in each stage, a second pulse source generating periodic switching pulses phase shifted 180° relative to said first pulses for 0-setting the cores in the second sub-stage in each stage, and a third pulse source generating switching pulses for 0-setting the first core in each sub-stage during the intervals of said first and second 0-setting pulses without influencing the second core in said sub-stage, the cores in each sub-stage having a winding loop which in a sub-stage with a sequence number $n$ couples said cores with the two cores in the preceding sub-stage with sequence number $n-1$ and with the first core in the following stage with sequence number $n+1$, said coupling allowing 1-setting of both cores of said sub-stage with sequence number $n$ upon 0-setting of the second core in the substage with sequence number $n-1$, the windings included in the winding loop of the sub-stage with sequence number $n+1$ and located on the cores of the sub-stage with sequence number $n$ being oppositely directed so as to prevent the sub-stage with sequence number $n+1$ from being influenced by the switching of the sub-stage with sequence number $n$, and the winding included in the winding loop of the sub-stage with sequence number $n-1$ and located on the first core of the sub-stage with sequence number $n$ being directed so as to neutralize the switching action of the second core in the stage with sequence number $n-1$ so as to prevent influencing of the stage with sequence numbers $n-2$.

References Cited

UNITED STATES PATENTS

| | | | |
|---|---|---|---|
| 2,956,266 | 10/1960 | Albin | 340—174 |
| 3,112,472 | 11/1963 | Neeteson | 340—174 |

BERNARD KONICK, *Primary Examiner.*

J. F. BREIMAYER, *Assistant Examiner.*

U.S. Cl. X.R.

307—88